Jan. 17, 1928.

B. B. GOLDSMITH 1,656,887

TESTING AND SORTING MACHINE

Filed Aug. 18, 1925

Inventor
Byron B. Goldsmith
By his Attorney H. M. MacKay

Jan. 17, 1928.

B. B. GOLDSMITH

1,656,887

TESTING AND SORTING MACHINE

Filed Aug. 18, 1925    10 Sheets-Sheet 2

Jan. 17, 1928.  
B. B. GOLDSMITH  
1,656,887  
TESTING AND SORTING MACHINE  
Filed Aug. 18, 1925  
10 Sheets-Sheet 6

Patented Jan. 17, 1928.

1,656,887

UNITED STATES PATENT OFFICE.

BYRON B. GOLDSMITH, OF NEW YORK, N. Y.; GEORGE A. SPIEGELBERG EXECUTOR OF SAID BYRON B. GOLDSMITH, DECEASED.

TESTING AND SORTING MACHINE.

Application filed August 18, 1925. Serial No. 50,920.

The present invention relates to a novel apparatus for testing and sorting insulated conducting rods, and, although it is particularly useful in the lead pencil industry, it is applicable in the case of other articles having an electrically conducting core.

In the manufacture of pencils it is desirable that the lead should be accurately centered. However great the care exercised in the process of manufacture, there are always many articles in which the lead is off center at one end or both. In order to pick these out, it is necessary to subject the entire output to an assorting process.

The method heretofore in use has been for an operator to examine the ends of several dozen at a time, and to pick out those that seem to be off center. Now it can be readily seen that the task is most difficult, because, if the leads are slightly off center, they will pass, but if too much, they must be thrown out. Each operator's judgment varies from that of the others, and, what is even worse, the eye soon becomes fatigued and great inaccuracy follows. The result is that pencils are often thrown out that ought to pass, and many are passed which should be thrown out.

My present invention provides means whereby the sorting of pencils and other articles having insulated conducting cores may be carried out rapidly, automatically, and with great accuracy. A further feature of the invention is that it makes it possible to sort out articles in which the conducting cores have been broken and sufficiently separated so that no electric current will pass through. In pencils etc. these defects cannot be detected by the eye, but my invention makes it possible to sort them out.

Obviously the sorting of defective articles from perfect ones will involve the use of means which do no more than indicate the condition of the article tested, and my invention covers mechanism which does no more than this. At the same time my invention goes further than this, and comprises mechanism which acts automatically in conformity with the indications produced by the test in each instance, to pick out and separate by mechanical means the defective from the perfect articles.

The invention is illustrated in a preferred form in the accompanying drawings, wherein Figure 15 is a vertical sectional view on the line 15—15 in Figure 14.

Pencils and other insulated rods of the character above mentioned may be defective in four ways. The conducting core may be eccentric at one end or at the other, it may be eccentric at both ends and it may be discontinuous within its envelope. Hence in my preferred machine I provide means for detecting any one of these faults, and sorting the defective rods into four corresponding groups.

Broadly considered the invention comprises means which are automatically applied to the ends of the rods successively whereby an electric circuit is closed through the core when it is eccentric at one end or the other or both as the case may be, combined with means actuated by the circuit thus closed for diverting any pencil from its normal path of progress through the machine.

That part of the machine intended to test and sort out rods having discontinuous cores is independent of the elements used for sorting out eccentric cores, and may or may not be employed with the latter, as desired. Of course where the test is made for continuity of core the parts are so arranged that the sorting out occurs when a circuit fails to close through the core, instead of when closure occurs as described in regard to sorting for eccentricity.

In the preferred embodiment of the invention herein set forth, the insulated rods are carried past the successive proving members by means of a reciprocating carrier. In order to save time this carrier preferably operates to produce forward movement of the rods on both forward and backward movement. The parts are duplicated and thus a double acting machine is produced. It is such a machine that is herein shown and described, but it is to be understood that the invention covers each half of the double machine by itself, since each half carries out all the operations involved and is complete in itself.

In Figures 1 to 5 is shown a framework 10, from which rises a pair of uprights 11, 12, supporting the two sides 13, 14, of a skeleton hopper into which are charged the rods 15 to be tested. These rods drop by gravity to the level of the reciprocating carrier or slide between guides 16 at their ends and are preferably kept from sticking or jamming by the agitators 17 and 18, to which a slight slow rocking movement is imparted by means hereinafter described.

Figure 5:
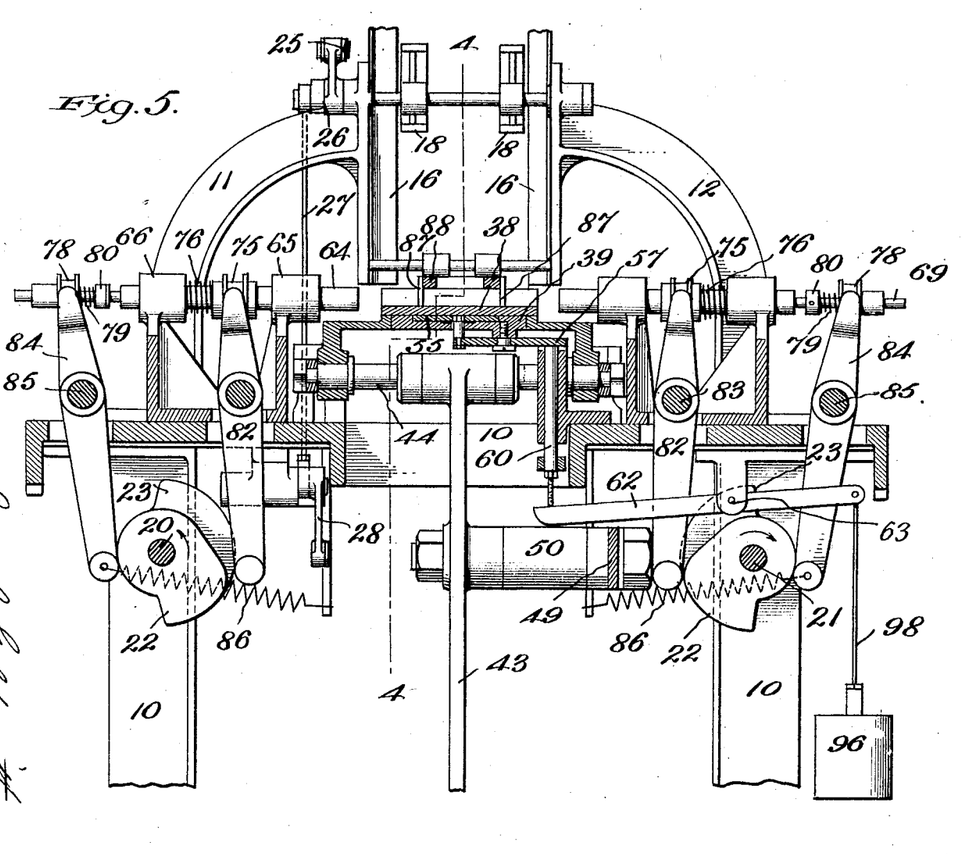
Figure 5 is a transverse vertical sectional view of the same on the line 5—5 in Figure 3.
Figure 6:
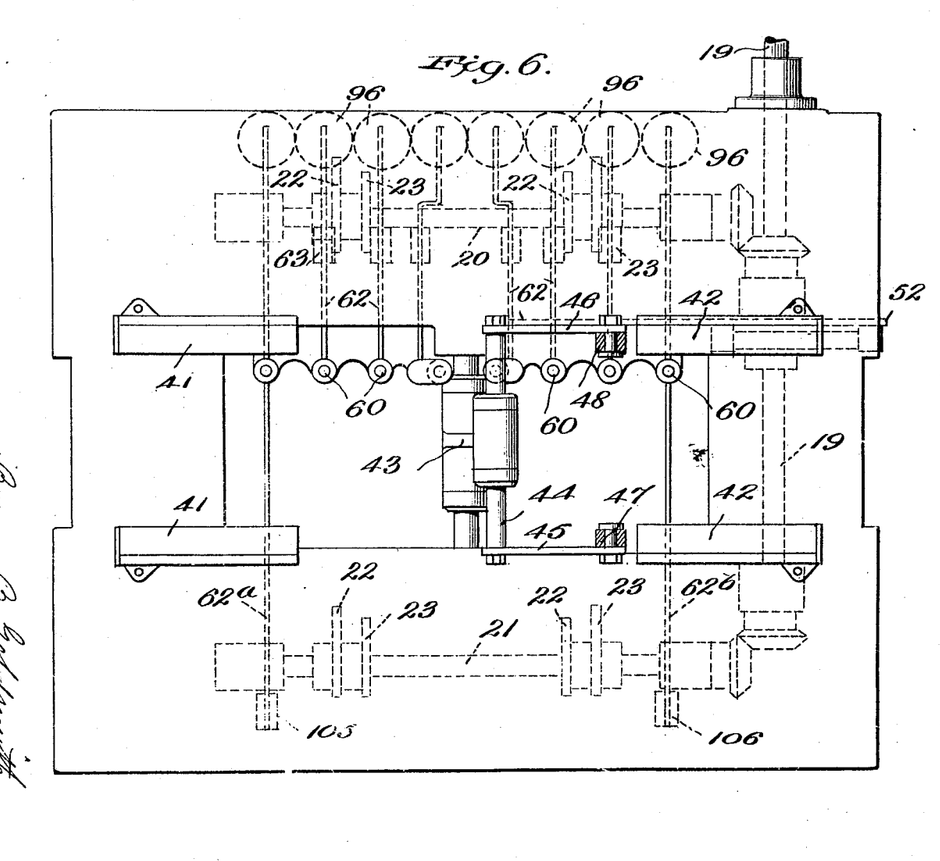
Figure 6 is a partial horizontal sectional view as seen after removing the sliding carrier and the parts above them.
Figure 7:
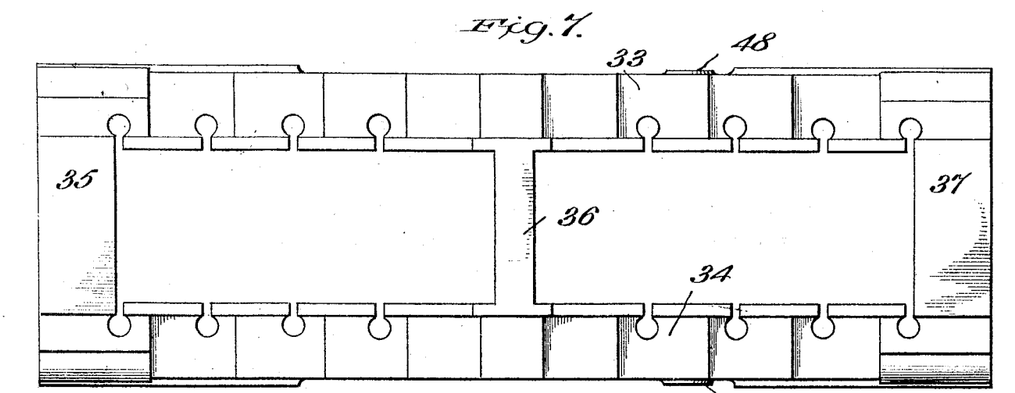
Figure 7 is a plan view of the skeleton support for the carrier slide.
Figure 8:
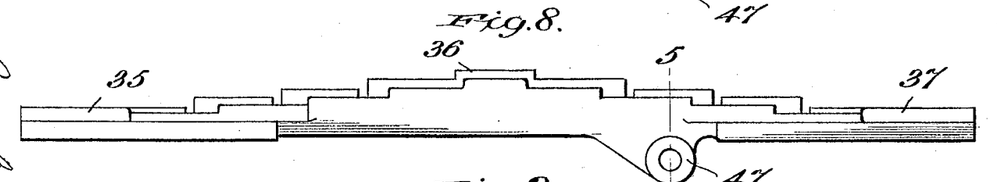
Figure 8 is a view of the same in side elevation.
Figure 9:
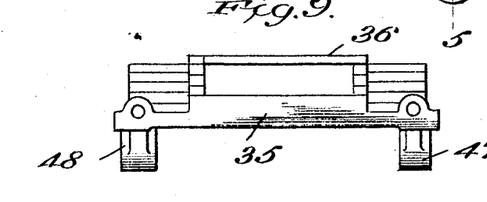
Figure 9 is an end view of the same.

The principal driving means (Figures 1, 2 and 6) comprise a primary driving shaft 19 which is made to revolve by an appropriate prime mover, not shown. On each side of the machine there extends a counter shaft 20, 21, geared as shown to the main shaft 19, and on each shaft is mounted a pair of fixed cams 22, 23, which turn in the direction of the arrows in Figure 5. As shown in Figure 6, these cams are duplicated on each countershaft in the double form of machine shown.

Figure 1:
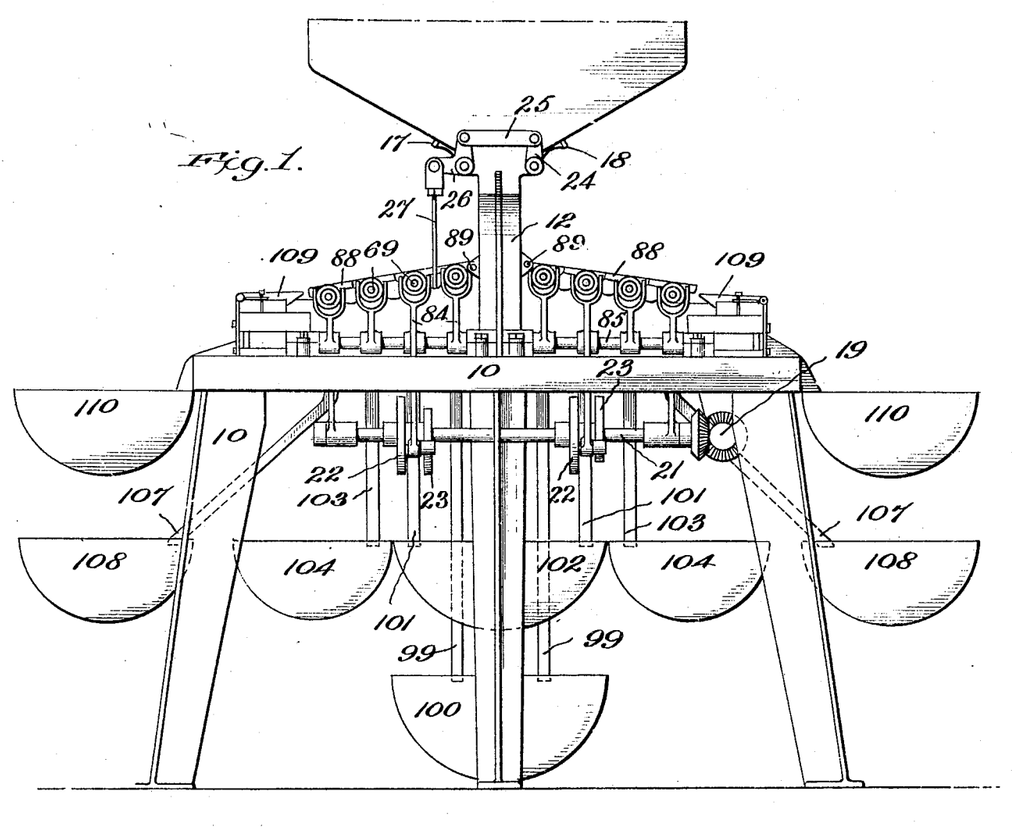
Figure 1 is a side elevation of a double machine embodying the invention.
Figure 2:
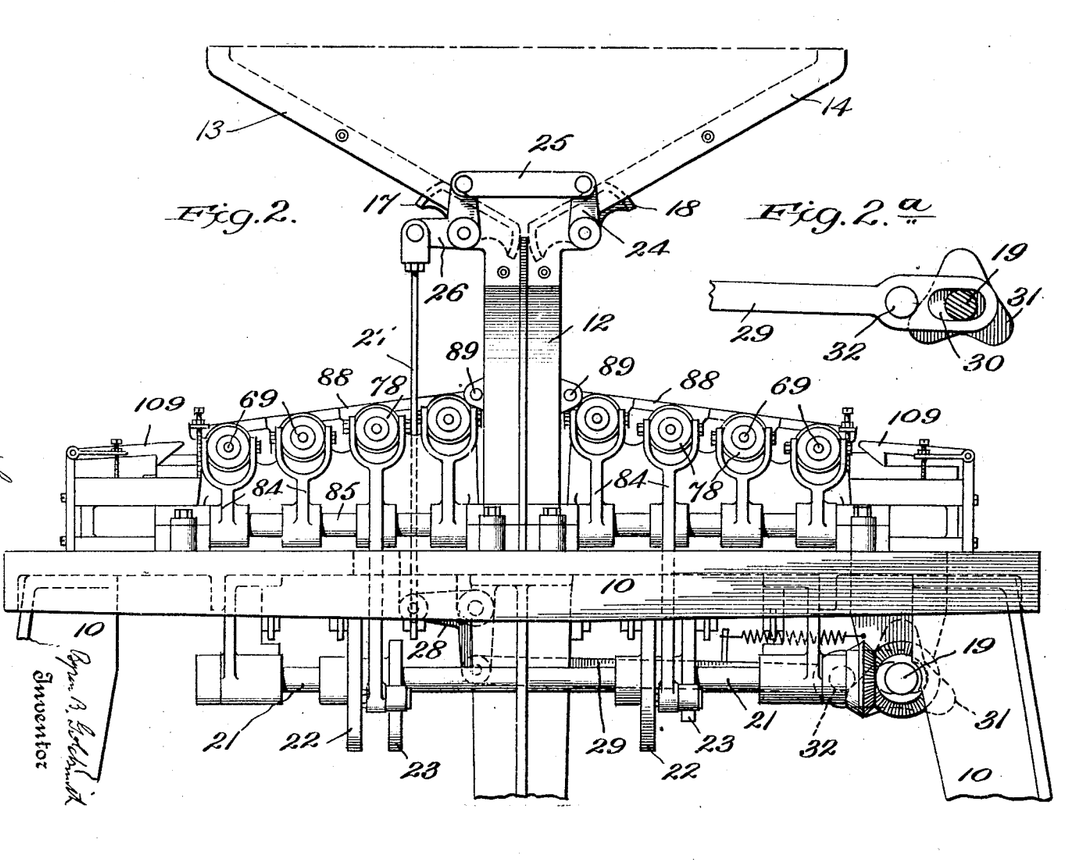
Figure 2 is a similar view of the upper part of the same on a larger scale, Figure 2$^a$ is a view in elevation of the cam and rod for actuating the agitators.
Figure 3:
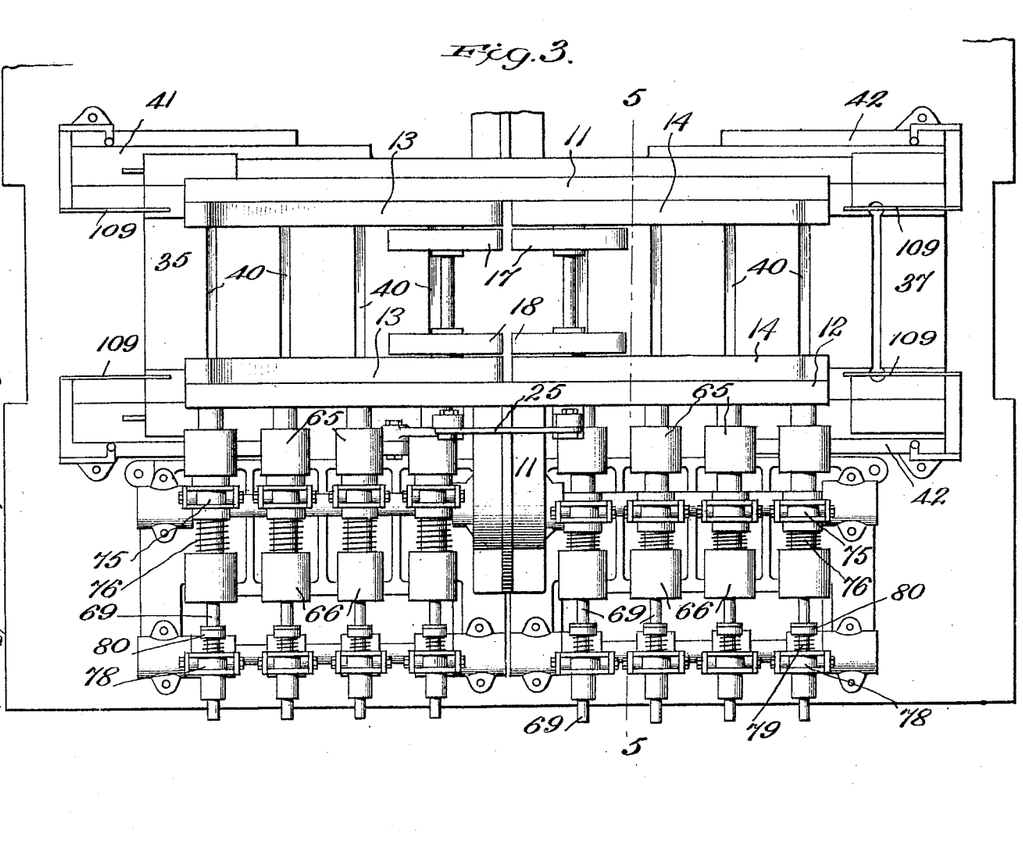
Figure 3 is a plan view of one half of the same.

As shown in Figure 2, the agitators 17 and 18 are connected on one side by an arm 24, a link 25 and a bell crank lever 26. One arm of the bell crank is connected by a rod 27 with a second bell crank 28 lower down which is made to rock by means of a bar 29 having a slot 30 riding on the shaft 19 (see Figure 2ª). A cam 31 on the shaft 19 acts through a pin 32 on the bar 29 to give this last a longitudinal reciprocation which causes the rocking of the agitators 17 and 18.

The construction of the preferred form of reciprocating carrier is best shown in Figures 7, 8, 9, 14 and 15. This carrier comprises a skeleton frame having two sides 33, 34, connected at the ends and middle by flat cross bars 35, 36 and 37. The two sides have a step-like construction as shown, and at each level upper and lower guide plates 38 and 39 are fixed so as to span the space between the sides 33 and 34. These plates are so placed as to leave narrow spaces 40 between adjacent pairs of plates, to let the conducting rods drop through in the act of sorting, as described hereinafter. This reciprocating carrier is carried upon flat guiding supports 41 and 42 at the two ends of the machine, and is made to slide horizontally on these supports preferably by the following means, best shown in Figures 4, 5 and 6.

Directly under the middle of the machine is an upright swinging lever 43, fulcrumed some distance under the machine at a point not shown in the drawings. The top of the lever 43 carries a transverse bar 44 which passes laterally through the wide space between the guiding supports 41, 42 (Fig. 6) and just under the sides of the skeleton frame 33, 34. Pivoted to the outer ends of the bar 44 are rods 45, 46, which are pivotally connected at their free ends with the sides 33 and 34 of the skeleton frame, at the bosses 47, 48 (see Figures 6, 7, 8 and 9).

Figure 4:
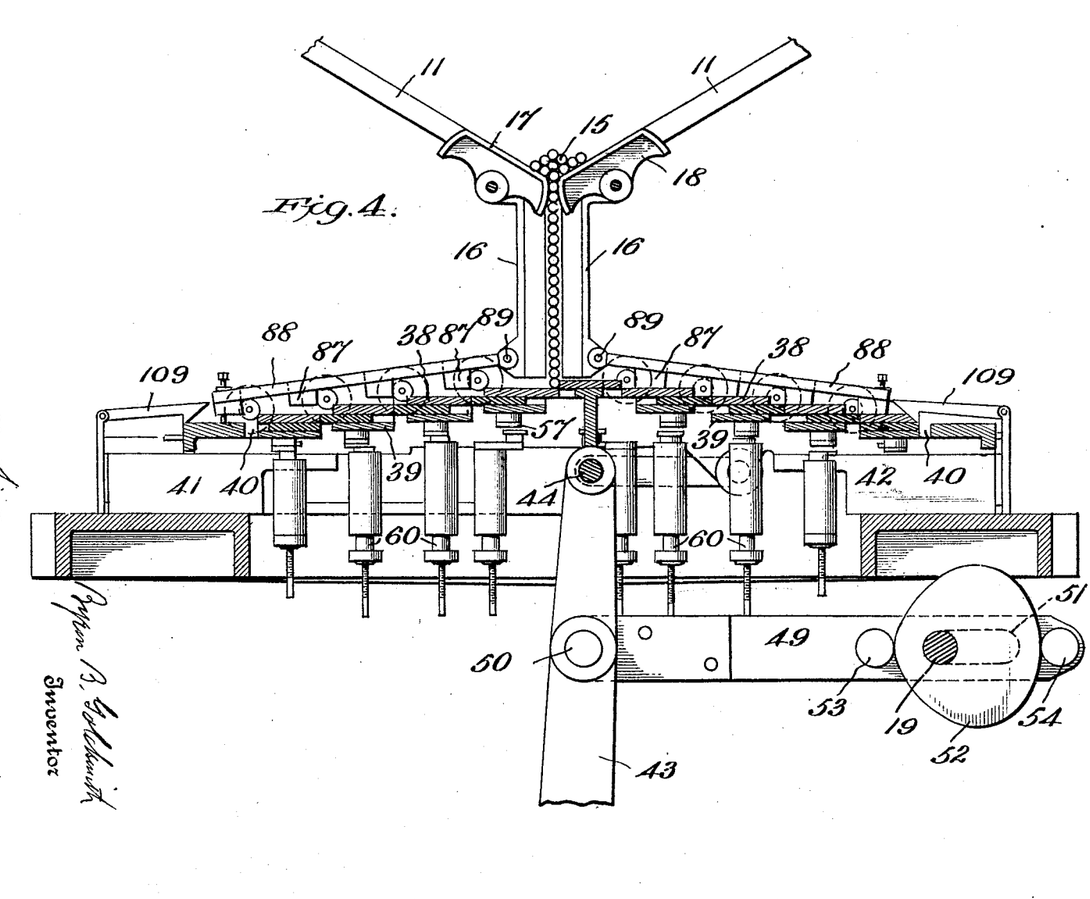
Figure 4 is a longitudinal vertical sectional view of the same on the line 4—4 in Figure 5.

The lever 43 is made to swing longitudinally of the machine, and so cause the carrier to slide, by means of a strap 49 pivotally attached to a projecting pin 50 on the lever 43. The opposite end of the strap 49 is slotted at 51 and rides on the shaft 19 (Fig. 4). The reciprocating movement of the strap 49 and lever 43 is produced by a cam 52, fixed upon the shaft 19, and moving between the pins 53 and 54 on the strap 49. The reciprocation of the carrier produced by the means just described causes the forward step-by-step movement of the insulated conductors as set forth hereinafter.

Figure 14:
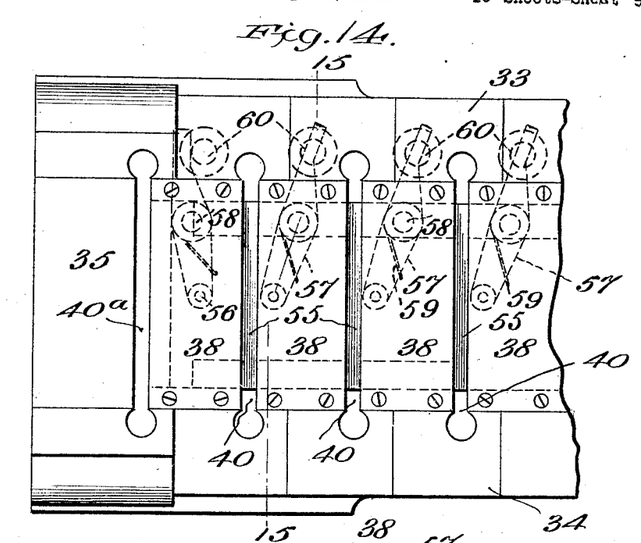
Figure 14 is a plan view of one end of the carrier-slide.

The conductors in this forward movement would drop into one or another of the spaces 40 (Fig. 14) were it not that at each such space there is located a horizontally slidable shutter 55 confined by and guided between the upper and lower plates 38 and 39, as shown in Figures 4 and 14. A pin 56 passes through a slot in the lower plate 39, and enters the shutter 55. This pin is pivotally carried at one end of a shifting lever 57 for each shutter, said lever being fulcrumed in the middle under the plate 39, at 58. A spring, as 59, holds the shutter in a normal position.

Just under each shifting lever 57 a vertical pin 60 is slidably mounted in a socket 61.

Figure 10:
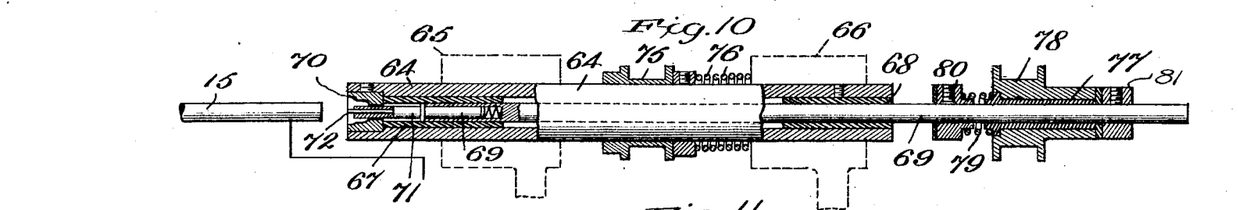
Figure 10 is a view partly in elevation and partly in vertical section of one of the centering and circuit-closing members, Figure 10$^a$ is a view in vertical section on an enlarged scale of one end of what is shown in Figure 10, Figures 11 to 13 inclusive are views similar to Figure 10, showing the same parts in the successive positions they assume during operation.
Figures 10A, 15:
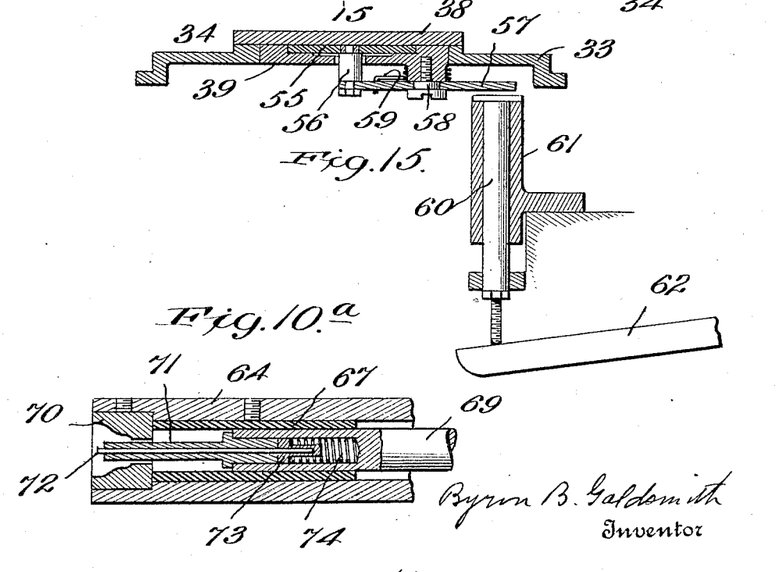

When the pin 60 is in the normal position shown in Figure 15, the shutter 55 and shifting lever 57 move idly back and forth with the carrier just above the pin 60. If, however, the pin be lifted while the carrier is in its extreme position to the left in Figure 14, for instance, on return movement of the carrier (toward the right) the shifting lever 57 above the particular pin 60 lifted will strike that pin, as shown in dotted lines at the left of Figure 14. This will cause the lever 57 to swing on its fulcrum 58 and shift the shutter 55 so as to open the space 40ª in Figure 14. The lifting of the pins 60 is accomplished by levers 62 operated as hereinafter described, and fulcrumed at 63 (see Fig. 5).

In the preferred form of my device, each pencil is carried past one proving element after another, and, according to the reaction produced by it on a given proving element, it either drops through the particular opening 40 opposite the given proving element, or passes on to the next proving element. The preferred construction of the proving elements and their mode of action is best shown in Figures 10 to 13, 10ª, 4 and 5.

Each proving element comprises a centering member and a circuit closing member adapted to slide within it. The proving elements are mounted in pairs placed in careful alignment directly in line above each opening 40 as shown in Figures 4 and 5. The construction and operation of the first pair, or that nearest the middle of the double machine will first be described.

The centering member of each element of a pair comprises a sleeve 64 adapted to slide horizontally and laterally with respect to the machine within bearings 65 and 66 shown dotted in Figures 10 to 13. Within the sleeve 64 are two insulating bushings 67 and 68 which serve as guiding bearings for the circuit-closing member. This last comprises a metal rod 69, concentric with the sleeve 64. A tapered hollow socket 70 at the open extremity of the sleeve 64 forms a part of the centering member.

The tip of the rod 69 is made hollow (see Fig. 10ª) and a tubular contact piece 71 projects from this hollow through a central opening in the socket 70, which opening is so large as not to touch the contact piece 71. I prefer to insure reliable operation by using an insulating pin 72 which snugly fits the bore of the tubular contact piece 71, being slidable therein. The inner end of 72 enters an insulating cup 73 having a flange as shown in Figure 10ª, against which bears a spring 74. This keeps the pin 72 normally in the position shown in Figures 10 and 10ª.

The sleeve 64 carries a collar 75 against which presses a spring 76 tending to press the sleeve 64 toward the left in Figures 10 to 13. Slidable on the rod 69, and insulated therefrom by a bushing 77, is a collar 78. One end of the bushing 77 bears on a spring 79 which also bears on a collar 80 fixed to the rod 69, so that, when the collar 78 and bushing 77 are moved to the left, they exert a yielding pressure in that direction on the rod 69. The opposite end of the bushing 77 is flanged as shown and presses against a collar 81 fixed on the rod 69. From this it is clear that, when the channelled collar 78 is pressed to the left in Figure 10, it moves the rod 69 to the left, acting through the spring 79; and, when the collar 78 is pressed to the right, it moves the rod 69 to the right, acting through the collar 81.

In Figure 5 are clearly shown the preferred means for imparting to the sleeve 64 and rod 69 the various successive movements hereinafter described. The grooved collar 75 which operates the sleeve 64 is controlled by a lever 82 fulcrumed at 83 and caused to bear against the cam 23 by the spring 76.

The grooved collar 78 on the rod 69 is controlled by a lever 84, fulcrumed at 85 and drawn against the cam 22 by the spring 86.

The operation of the machine can now be describd. With the parts in the positions shown in Figure 4, one of the conductors 15 is seen to be located on the next to the highest plate 38 of the carrier, and directly in front of the topmost plate. Assuming this particular conducting rod 15 to be correctly centered at both ends it will be acted upon by the machine as follows.

When the carrier is moved to the left in Figure 4, by the swinging lever 43, the plate 38 on which it rests will slip under the depending projections 87 on the swinging frame 88 fulcrumed at 89, while the edge of the topmost plate 38 pushes the ends of the rod 15 against these projections at the two sides of the machine. This brings the rod 15 into the position shown in Figure 10 with respect to the two opposed proving elements nearest the middle of the machine, which may be termed the first pair of proving elements.

Figure 11:
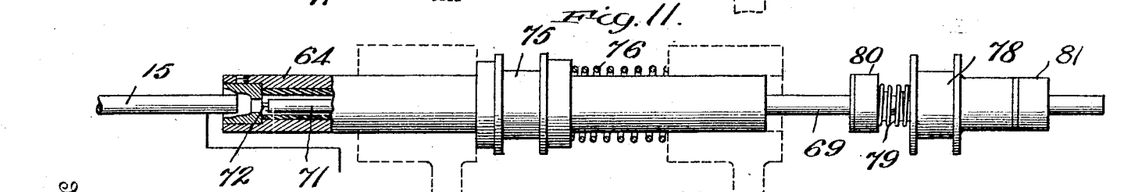

At once, the sleeve 64 on each side moves toward the middle line of the machine, and the rod 15 is held in centered position in the sockets 70 at its two ends, as shown at one end in Figure 11. The rod being thus supported, the rod 69 moves forward bringing the annular insulated metallic face of its tubular tip into yielding contact with the ends of the rod 15, as in Figure 12. Since the conducting core of this particular rod is assumed to be perfectly centered, and the diameter of the bore in the tip 71 (Fig. 10ª) is greater than the diameter of the conductor in the rod 15, the annular face of the tip 71 will surround said conductor without touching it, and no circuit will be closed.

Figure 12:
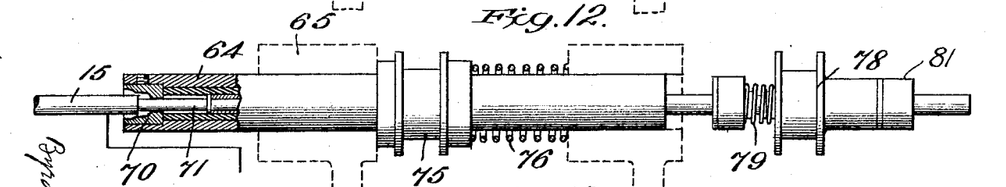
Figure 13:
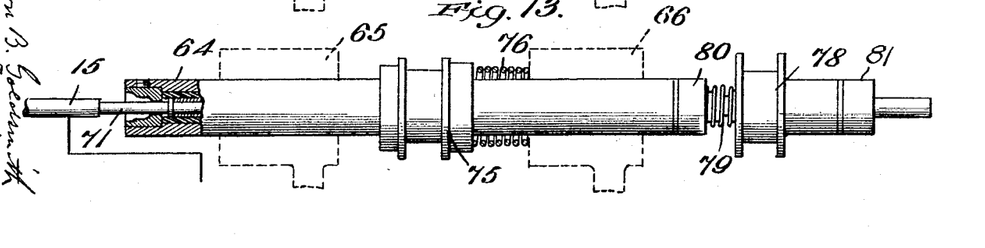

As soon as the position shown in Figure 12 is assumed by the machine, the carrier will begin to swing toward the right to resume the position shown in Figure 4 and to pick up another conductor 15. At the same time, the sleeve 64 will move to the right, assuming the position shown in Figure 13, in which the rod 15 is supported by the rod 69 and contact piece 71 only.

Just as the carrier again reaches the position shown in Figure 4, the rod 69 moves swiftly back, reproducing the position shown in Figure 10, and the rod 15 is dropped onto the shutter 55 directly in front of the edge of the same plate 38 upon which it previously rested.

Each succeeding leftward movement of the carrier carries the rod 15 to another pair of proving elements where the operations just described are repeated. At the same time a new rod 15 is brought to the first pair of proving elements. Thus a continuous series of rods 15 are being advanced through the machine.

It may be stated here that even if the first rod 15 were out of center at one end only, instead of being satisfactorily centered at both ends, the operation above described with relation to the first pair of proving elements would be as above described.

Assuming now, however, that a rod 15 which is out of center at both ends is brought to the first pair of proving elements, it will be diverted from the procession of rods in the following manner.

As soon as the position shown in Figure 12 is reached, a circuit will be closed (see Figure 16) starting from the generator 90, by wire 91, through the two rods 69 of the first pair and the conducting rod 15 between them, by wire 92, through a relay coil 93, and by wire 94, back to the generator 90. The relay closes an operating circuit, by wire 95, solenoid coil 96, switch points 97 and wire 94. There is a separate solenoid 96 for each pair of proving elements, shown in dotted lines in Figure 6.

As shown in Figure 5, the solenoid 96 swings the lever 62 by means of the rod 98, and lifts the pin 60 into the path of the shifting lever 57. The carrier moves at once to the right in Figure 4, and this causes the lever 57 to swing whereby the shutter 55 is shifted, and, when the rod 15 is finally released by retraction of the rod 69, it is allowed to fall through the opening 40 into a chute 99 which carries it to a container 100, designed to receive rods 15 wherein the conductor is out of line at both ends.

Figure 16:
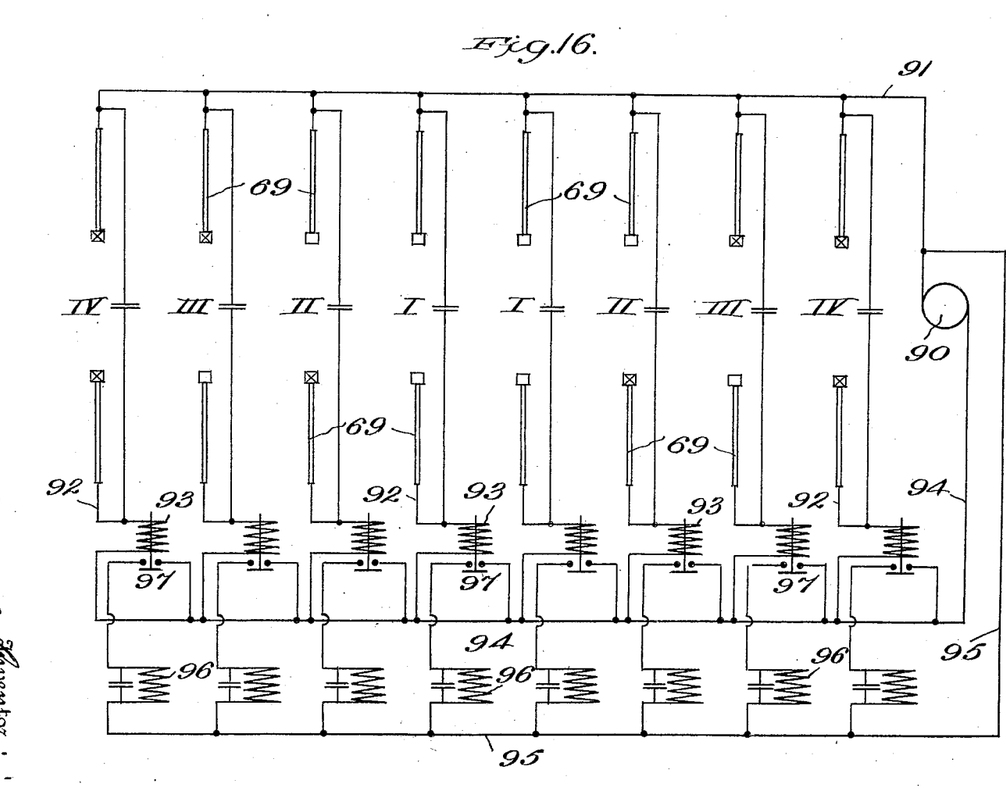
Figure 16 is a conventional diagram showing the preferred electrical wiring employed in the operation of the invention.

In Figure 16 squares have been placed at the inner ends of the rods 69 to indicate the slight structural differences at the contacting tips whereby the functions of the successive pairs of proving elements are differentiated. The open squares in this diagram indicate rods 69 whose tips are tubular as shown in Figure 10ª. The crossed squares indicate rods 49 having solid closed metallic ends. Such ends make effective contact with the exposed ends of the conductors in the rods 15, whether these latter are properly centered or not. Consequently a rejecting circuit cannot be produced at I in Figure 16 unless both ends of the conductor are out of center in the rod 15. As shown, when this is the case, the rod goes to the receptacle 100.

When a rod reaches II in Figure 16, it will only close a rejecting circuit if the conductor is out of center on the side indicated by a blank square. In this case it will be dropped through the chute 101 to receptacle 102. If it passes this point and it is out of center on the opposite end, contact will be made on the side indicated by the blank square at III and it will be dropped through chute 103 to receptacle 104.

If a conductor rod 15 passes III successfully it is proven to be properly centered at both ends, and it can either be removed as satisfactory at this point or, as preferred, it can pass on to IV where it is tested for continuity within its insulating envelope.

Normal conditions at IV differ from those at the other proving positions, in that the openings 40 are normally open, as shown at the two extremities of Figure 4. Since failure of continuity of the conductor 15 causes failure of circuit at IV, the opening 40 must only be closed by its shutter when circuit occurs. As shown in Figure 16, both rods 69 at IV have closed metal ends, and if the conductor is properly continuous, the appropriate solenoid 96 will operate under these conditions instead of lifting the corresponding pin 60, as in the other cases, it lowers said pin and permits the corresponding shutter 55 to close the opening 40.

This reversal of operation is preferably accomplished by changing the fulcrum of the lever 62 operated by the solenoid. This is shown at the two ends of Figure 6, where the long levers 62ª, 62ᵇ are fulcrumed at 105 and 106 on the side of the machine away from the solenoids operating them, the corresponding pins 60 being between the solenoid and the fulcrum. If circuit fails at IV due to a defective conductor, the rod 15 passes by the chute 107 to the receptacle 108.

The rods which have successfully passed all four proving positions are finally pushed under the stripping hooks 109, and fall into the receptacle 110. It will thus be seen that the machine not only rejects defective conducting rods 15, but sorts them according to the nature of the defect.

It will be understood of course that each time the carrier moves to the left in Figure 4, rods 15 are advanced past the proving points on the left, and, conversely, that when the carrier moves to the right, rods are advanced past the proving points at the right. Idle movement of the carrier is thus avoided by duplicating the construction already described.

It will be understood that many changes may be made in the construction herein set forth without departing from the scope of my invention, which is not limited to the details herein shown and described.

What I claim is:—

1. In a testing machine for insulated rods having electro-conductive cores, a proving element having an electro-conductive member adapted to be brought against the end of said rods, means for moving said rods past said proving element, means for diverting a rod from the normal path of movement, an electro-magnetic device for actuating said diverting means, and a circuit adapted to be closed through a rod and said proving element for energizing said electro-magnetic device.

2. In a testing machine for insulated rods having electro-conductive cores, pairs of aligned proving elements each having an electro-conductive member adapted to be brought against the ends of said rods, means for moving said rods past said proving elements, means for diverting a rod from the normal path of movement, an electro-magnetic device for actuating said diverting means, and a circuit adapted to be closed through one of said rods and said pairs of proving elements for energizing said electro-magnetic device.

3. Apparatus as in claim 2 wherein one of each of the pair of aligned proving means is adapted to make contact with one end of the insulation of each rod close to the centered core thereof and out of actual contact therewith.

4. Apparatus as in claim 2 wherein one of each of the pair of aligned proving means is adapted to make contact with one end of the insulation of each rod all around and close to the centered core thereof and out of actual contact therewith.

5. Apparatus as in claim 2 wherein one of each of the pair of aligned proving means is adapted to make contact with one end of the insulation of each rod close to the centered core thereof.

6. Apparatus as in claim 2 wherein one of each of the pair of aligned proving means is adapted to make contact with one end of the insulation of each rod and with the core whether properly centered or not.

7. In a machine of the character described, a proving element, means for conveying insulated electro-conductive rods past said element, said means having an opening and a movable shutter for said opening, electro-magnetic means for operating said shutter and a circuit adapted to be closed through an electro-conductive rod and said providing element to control said electro-magnetic means.

8. In apparatus as in claim 7, a reciprocating carrier having a series of plates on different levels, separated by successive spaces and a separate shutter for each space.

9. Apparatus as in claim 7 is combination with a stop for the electro-conductive rods adapted to halt said rods over the opening in the conveying means and opposite the providing element.

10. Apparatus as in claim 7 in combination with a pivoted frame over the conveying means having a stop depending therefrom adapted to halt the conducting rods opposite the providing element.

11. In a machine of the character described, a reciprocating carrier having a transverse slot, a shutter borne on the carrier and adapted to move across said slot, a pivoted lever also on the carrier pivotally connected with said shutter and a movable stop adapted to be brought into the path of movement of said lever as it moves in one direction with the carrier.

12. Apparatus as in claim 11 in combination with a proving element, as electro-magnetic device for moving the stop for the shutter-lever, and an electric circuit adapted to be closed through said proving element and said electro-magnetic device.

13. In a machine of the character described a reciprocating carrier comprising pairs of plates on different levels separated by transverse slots, shutters fitting between said pairs of plates and adapted to move across said slots, and means adapted to be operated by movement of said plates for operating said shutters.

14. In a machine for sorting insulated rods having electro-conductive cores, centering means for the rods in combination with means for closing a circuit through the cores of said rods, and means operated by said circuit for controlling the course of movement of said rods.

15. Apparatus as in claim 14 wherein the centering means comprise a reciprocating centering tube and a contact-making member slidably mounted within said tube.

16. In a machine for testing and sorting rods having conductive cores, and in combination with motive devices for causing movement of such rods over different paths; electromagnetic means for controlling said motive devices comprising a proving element having a centering member, a contact making member slidably fitting the same, automatic means for causing reciprocation of said centering member and independent automatic means for causing reciprocation of said contact making member.

17. Apparatus as in claim 16 wherein the centering member is provided with a centering socket at one end and with an insulating bushing fitting around the contact making member.

18. Apparatus as in claim 16 wherein the contact making member has a tubular contact tip at one end.

19. Apparatus as in claim 16 wherein the contact making member has a tubular contact tip at one end and a spring pressed insulating pin fitting within said tubular contact pin.

20. An automatic sorting machine comprising a series of proving elements, motive means adapted to move a plurality of insulated conducting rods past said elements, electromagnetic devices adapted to control said motive means, and electric circuits for actuating said devices controlled by said proving elements.

21. Testing means for rods having conductive cores comprising an electro-magnetic indicator in combination with an electric circuit for actuating the same, centering means, and means adapted to make electric contact with an electro conductive core for closing said actuating circuit.

In testimony whereof I have hereto affixed my signature on this 15th day of August, 1925.

BRYON B. GOLDSMITH.